Feb. 7, 1956  H. J. BUTLER  2,733,783
BRAKE DRUM
Filed Jan. 19, 1950  2 Sheets-Sheet 1
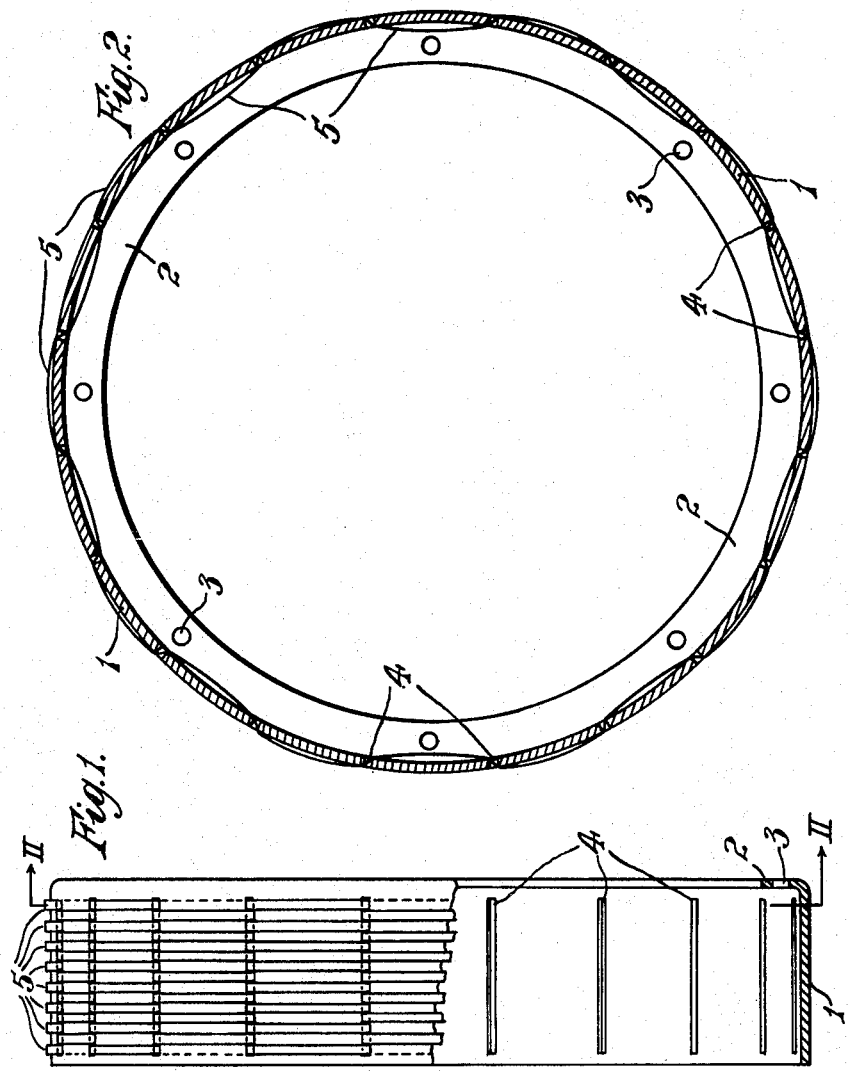
INVENTOR
Henry James Butler
by Benj. T. Rauber
his attorney Feb. 7, 1956 H. J. BUTLER 2,733,783
BRAKE DRUM
Filed Jan. 19, 1950 2 Sheets-Sheet 2
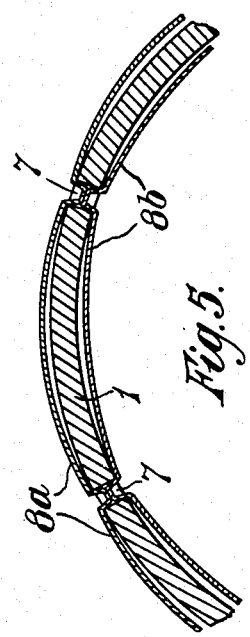
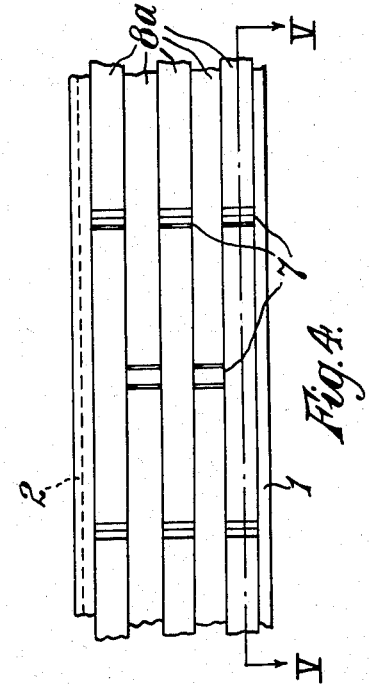
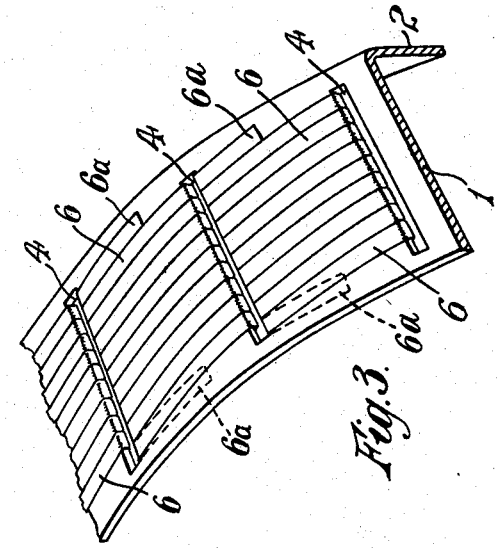

United States Patent Office 2,733,783
Patented Feb. 7, 1956

2,733,783

BRAKE DRUM

Henry James Butler, Sutton Coldfield, England, assignor to Dunlop Rubber Company Limited, London, England Application January 19, 1950, Serial No. 139,340

Claims priority, application Great Britain February 1, 1949

2 Claims. (Cl. 188—218)

This invention relates to drum brakes for vehicles, and more particularly to brake drums for aircraft brakes.

Most vehicles brakes belong to one of two different types, i. e. drum brakes, in which friction elements engage with the internal or external surface of a drum which rotates with the wheel, the cylindrical friction surface of the drum extending parallel to the axis of the wheel, and disc brakes, in which friction elements engage with the radially-extending surfaces of a disc which is co-axial with and rotated by the wheel, the friction surface in this case being normal to the wheel axis.

When an aeroplane or other vehicle is brought to a standstill by means of its brakes its kinetic energy is converted into heat in the brake assembly. With the high speed and weight of modern vehicles, particularly aeroplanes, a great amount of heat is developed in the short time occupied by the braking operation, and unless this heat is rapidly dissipated the temperature rise in the brakes may be so high that charring of friction elements contaning organic binders and superficial fusion of metal braking surfaces occur. Where drum brakes are employed, general distortion of the brake drum may occur, e. g. the mouth of the drum may expand outwardly so that the friction surfaces are no longer parallel with the axis of the wheel. When this happens, frictional contact between the friction surfaces of the drum and the friction elements is reduced, and the efficiency of the brakes consequently falls off very rapidly. Moreover a conventional brake drum has considerable weight, and this is disadvantageous in an aircraft.

It is the object of this invention to provide a brake drum for drum brakes which is light in weight, which is rapidly cooled and wherein little or no distortion occurs.

According to the invention a brake drum is provided on one or both sides with a metal element separate from but locally attached thereto.

Preferably the brake drum comprises an axially-extending wall and a radially-extending web and the wall is provided with a plurality of axially-extending slots. A metal element is wound around the wall of the drum and in and out of adjacent slots. The wall and the web of the drum are very thin and may be made of light alloy. Preferably the metal element is springy so that it stands proud of the face of the wall at each turn of its winding. Thus cooling air can pass on both sides of the element and materially increase the cooling rate.

In order that the invention may be more fully described, reference is made to the accompanying drawing, in which:

Figure 1 is a part sectional side elevation of a brake drum in accordance with one embodiment of the invention.

Figure 2 is a section through II—II of Figure 1 looking in the direction of the arrows.

Figure 3 is a perspective sketch of part of a brake drum made in accordance with another embodiment of the invention.

Figure 4 is a side elevation of part of a brake drum made in accordance with yet another embodiment of the invention.

Figure 5 is a section through V—V of Figure 4, looking in the direction of the arrows.

In one embodiment of the invention (Figures 1 and 2) a brake drum comprises an annular axially-aligned wall, 1 and an annular radially-aligned web 2, integral therewith, and adapted to be attached to a wheel by bolts passing through a plurality of holes 3 equispaced around said web. The wall of the drum is thin, of the order of 1/16 inch and is provided with an even number of equispaced, axially-aligned slots 4, each extending from a location adjacent one edge of the wall to a location adjacent the other edge.

A plurality of lengths of beryllium-copper strip 5, each about 3/32 inch wide and 0.003 inch thick are wound around the wall of the drum and in and out of adjacent slots, the ends of each strip being secured together, e. g. by welding, within one of the slots. The strips are wound parallel to one another and to the edge of the wall of the drum, and adjacent strips are pressed firmly one against the other. The strips are preferably wound through the slots in the wall of the drum in such a manner that, taking any one portion of the wall between adjacent slots, adjacent strips pass alternately in front of and behind said wall. The friction elements are thus distributed evenly over both sides of the wall of the drum. Preferably also, the metal friction elements are slightly springy, and stand slightly proud of the wall of the drum at each turn of their interlacing.

In another and similar construction (not illustrated) a single length of beryllium-copper strip is wound helically around the axially-extending wall of the drum and in and out of adjacent slots, each end of the strip being secured to the drum. Preferably an odd number of slots are provided so that, taking any one portion of the wall between two adjacent slots, the metal strip passes alternately in front of and behind said portion with each complete convolution of the strip. As in the previous construction, adjacent turns of the strip are pressed firmly one against the other and preferably also the strip is springy so that it stands proud of the wall of the drum.

In another embodiment of the invention (Figure 3) a slotted brake drum as hereinbefore described is provided, and the friction elements in this case comprise a plurality of springy beryllium-copper strips 6 wound helically around each of the axially-aligned portion of the wall between adjacent slots, the free ends of each element 6a being secured to the wall of the drum by e. g. welding.

In yet another embodiment of the invention (Figures 4 and 5) a brake drum is provided having a thin axially-extending wall 1 and a radially-extending web 2. The wall is provided with a plurality of sets of rectangular slots 7, the slots of each set being equispaced around the periphery of said wall and the slots of one set being staggered with respect to the slots of adjacent sets. In the embodiment described there are six sets of slots disposed across the axial width of the wall, and twenty circumferentially-spaced slots to each set.

Extending circumferentially around each set of slots are two annular strips of friction material, one strip, 8a being associated with the outside of the wall of the drum and the other strip 8b being associated with the inside of the wall. The pair of strips associated with each set are secured together within the slots of that set. One advantage of this form of construction is that almost the entire braking area of the drum is covered by friction element.

An important advantage of these forms of construction is that the walls of the drums are substantially thinner than these previously used, being merely thin shells to afford a backing for the metal friction elements. The total weight of the drum is therefore substantially reduced and this is an important factor in aircraft design. A further advantage is that the heat generated by friction in braking is largely absorbed by the elements and may be speedily dissipated by the air blowing between and through said elements. The drum itself is only heated by conduction from the elements, and since the walls of the drum are very thin, the contained heat is speedily dissipated. Again, the slotted construction of the drum allows a certain proportion of air to pass through it, and so accelerate the cooling process. Thus distortion of the drum by excessive heat is largely reduced or prevented.

This construction is of greatest value in conjunction with "single-spot" brakes, i. e. brakes in which the friction pad contacts the wall of the drum over a minor portion of the drum's periphery, as in this construction the major portion of the drum is revolving in cooling air. The friction pad may be provided on the inner surface of the drum or the outer, or may be a combination of both inner and outer.

Whilst the element has been described as a strip of beryllium-copper wire, it is understood that any material having good wearing qualities and a high thermal conductivity may be employed. Such materials may, e. g. be nickel-chrome or tungsten.

It is also within the scope of the invention to locally attach a facing of, e. g., wire gauze to the wall of the drum and such an attachment may be brazing or spot-welding.

Having described my invention—what I claim is:

1. A brake drum comprising an axially extending wall and a radially extending web, a plurality of slots extending axially across said wall and a metal friction element wound around said wall and in and out of adjacent slots, wherein the friction element is springy and is spaced away from the wall of the drum between said slots to provide an air space therebetween.

2. A brake drum comprising an axially extending wall and a radially extending web, a plurality of slots extending axially across said wall, and a springy metal friction element passing through each pair of adjacent slots and forming an axially extending helical winding around and spaced away from the intervening portion of the drum to provide an air space therebetween.

References Cited in the file of this patent

UNITED STATES PATENTS

| | | |
|---|---|---|
| 931,988 | Bonner | Aug. 24, 1909 |
| 1,493,433 | Guay et al. | May 6, 1924 |
| 1,613,669 | Maynard | Jan. 11, 1927 |
| 1,637,894 | Crane | Aug. 2, 1927 |
| 1,639,519 | Lonson | Aug. 16, 1927 |
| 1,700,492 | Guay | Jan. 29, 1929 |
| 1,745,173 | Leonard | Jan. 28, 1930 |
| 1,789,918 | Waite | Jan. 20, 1931 |
| 2,105,323 | Hunt | Jan. 11, 1938 |
| 2,270,477 | Ruesenberg | Jan. 20, 1942 |
| 2,656,021 | Butler | Oct. 20, 1953 |

FOREIGN PATENTS

| | | |
|---|---|---|
| 209,262 | Great Britain | Jan. 10, 1924 |